United States Patent [19]

Hersh

[11] 4,040,671
[45] Aug. 9, 1977

[54] SPOKED WHEEL

[76] Inventor: Lawrence K. Hersh, 6306 Whitsett Ave., North Hollywood, Calif. 91606

[21] Appl. No.: 589,202

[22] Filed: June 23, 1975

[51] Int. Cl.² .............................................. B60B 1/02
[52] U.S. Cl. ........................................ 301/58; 301/69
[58] Field of Search ................. 301/5 R, 37 H, 55-58, 301/67-69, 96-98, 104, 105 R, 105 B, 108 R, 108 TW, 9 DP, 9 S, 9 SB, 9 SC, 9 TV, 10 R, 11 R, 12 R, 12 M, 14 B; 29/159.3, 159.02, 159.03

[56] References Cited

U.S. PATENT DOCUMENTS

| 466,789 | 1/1892 | Jeffery | 301/67 |
| 622,593 | 4/1899 | Bishop | 301/55 |
| 1,481,830 | 1/1924 | Clark | 301/37 H |
| 1,944,658 | 1/1934 | Griffith | 29/159.3 |

2,937,905  5/1960  Altenburger ........................ 301/58

Primary Examiner—Robert B. Reeves
Assistant Examiner—H. Grant Skaggs
Attorney, Agent, or Firm—Roger A. Marrs

[57] ABSTRACT

A spoked wheel is disclosed herein having a rim including a pair of circular flanges outwardly projecting from the opposite sides thereof so as to accommodate a pneumatic, tubeless tire. The rim further includes a false rim depending from the inside diameter of the rim and separated from the rim by an annular passageway. The false rim is provided with a plurality of offset and spaced apart holes for receiving spoke anchoring pins. Provided between adjacent ones of the holes, the false rim is provided with an access aperture through which replacement pins may be inserted. A removable cap covers each of the apertures when not in use.

7 Claims, 3 Drawing Figures

SPOKED WHEEL

BACKGROUND OF THE INVENTION

1. Field of the Invention

This invention relates to spoked wheels and more particularly to a novel such wheel having access means for readily removing or installing spoke anchoring pins.

2. Brief Description of the Prior Art

In the past, it has been the conventional practice to mount pneumatic tires of the tubeless type onto rims having outwardly projecting circular flanges so that an air tight seal is provided between the circular flanges and its associated bead of the tubeless tire. The tubeless pneumatic tires are mounted on a metal wheel rim whereby the pressurized air within the tire cavity urges the circular beads of the tire defining the engagement points of the tire with the rim so as to seal therewith. Normally, pressurized air is introduced into the tire cavity via a valve having a stem projecting through a hole in the rim. When the tire is inflated, the circular beads of the tire are forcibly urged into contact with the circular flange of the rim so that an effective seal is produced.

With respect to spoked wheels, the rim is further provided with a plurality of holes wherein each hole receives a spoke anchor pin. Each pin includes a threaded bore opening at one end to receive the threaded shank end of a spoke while the opposite end of the pin includes an integral flange of greater diameter than the hole through which the body of the pin passes. Difficulties have been encountered when it is desired to replace the anchoring pin or when it is desired to tighten or realign the spokes on the wheel. These problems generally stem from the fact that the tire must first be deflated and in most circumstances the tire must be removed so that access may be had to the flanged end of the pins whereby alignment and tightening tools may be attached thereto. The removable of the tire is cumbersome and time consuming.

Therefore, a long standing need is present to provide a novel spoked wheel having a rim providing ready access to the anchoring pins without the necessity of deflating the tube or tire and without the necessity of tire removal.

SUMMARY OF THE INVENTION

The above problems and difficulties are obviated by the present invention which provides a novel spoked wheel having a rim including integral outwardly projecting circular flanges for receiving a pneumatic tire of the tubeless type and which further includes a false rim arranged in fixed spaced apart relationship so as to depend from the inner diameter of the main rim. The false rim is provided with a plurality of off-set holes wherein each hole receives a spoke anchoring pin and a plurality of apertures are provided so that one aperture is employed between adjacent ones of the spoke anchoring pins. Ready access is provided to the pins via the access apertures and removable cover means are provided for closing the apertures when not in use.

Therefore, it is among the primary objects of the present invention to provide a novel spoked wheel having a rim formed with access means so that ready access may be had to adjacent spoke anchoring pins without tire removal or deflation.

Another object of the present invention is to provide a novel means for gaining access to spoke anchoring pins without disturbing a normally inflated tire or tube.

Still a further object of the present invention is to provide a novel spoked wheel having a hollow circular rim providing spaced apart first and second rim sections whereby the first rim section cooperates with the tube for holding air within the tube and the second rim section provides access means for reaching adjacent spoke anchoring pins for tightening or replacement purposes.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
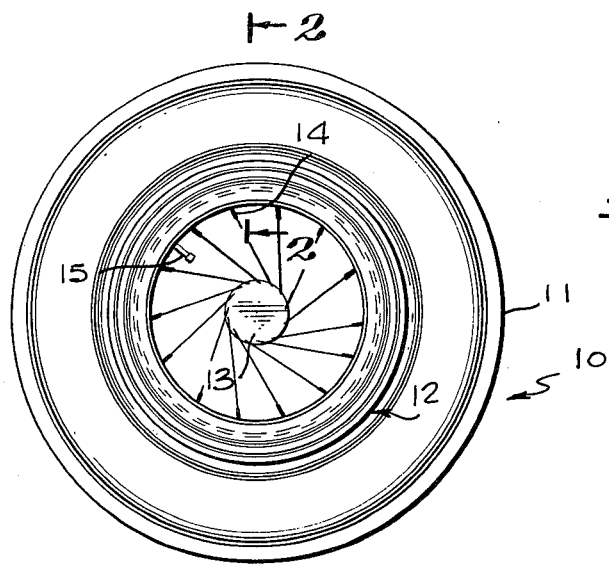
FIG. 1 is a side elevational view of the novel spoked wheel having a rim incorporating the present invention.

Referring to FIG. 1, a conventional tire assembly is shown in the general direction of arrow 10 which is mounted on the novel spoked rim of the present invention. The conventional tire includes a tubeless pneumatic tire 11 which is carried on the novel rim noted in general by the numeral 12. The wheel further includes a central hub 13 and a plurality of spokes extend between the peripheral edge of the hub and the inside diameter of the rim 12. One such spoke is indicated by the numeral 14 and a valve stem 15 is employed for introducing air into the tire 11.

Figure 2:
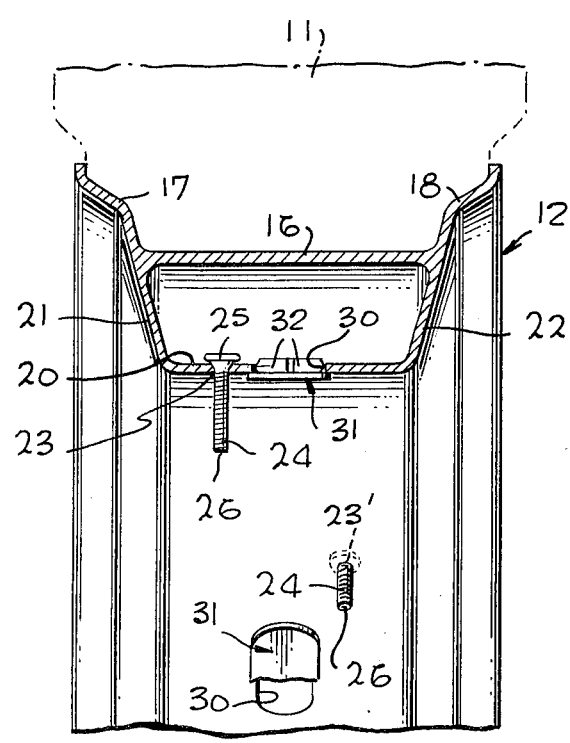
FIG. 2 is an enlarged sectional view of the spoked wheel shown in FIG. 1 as taken in the direction of arrows 2—2 thereof.

Referring now in detail to FIG. 2, the novel spoked wheel rim 12 includes a first or main rim 16 that includes outwardly radiating circular flanges 17 and 18 against which the beads of the tire 11 reside in sealing relationship when the tire 11 is adequately inflated. In this manner, the rim 16 collaborates with the circular flanges and the side walls of the tire to provide an air cavity for holding the pressurized air. The first or main rim 16 is solid in cross section and there are no holes, apertures or other openings therein which would normally be used in a conventional spoked wheel for accommodating the spoke anchoring means. However, the novel spoked wheel rim 12 further includes a second or false rim 20 that depends from the first or main rim 16 by integral side members 21 and 22. Therefore it can be seen that the false rim 20 is separated and spaced apart from the first or main rim 16 and that an annular passageway is defined between the two rims.

The second or false rim 20 includes a plurality of holes 23 and 23' for receiving a plurality of spoke anchoring means such as pins 24. Each anchor pin 24 includes an annular flange 25 which is of greater diameter than the hole 23 so that the pin can only be inserted from the back side of the rim 20 and when so inserted, the flange 25 keeps the pin 24 from falling therethrough. The opposite end of the pin 24 includes an opening leading into a threaded cavity indicated in general by numeral 26 for threadably engaging with one end of the spoke 14. As is the conventional practice, when the pin 24 is rotated or alternately, when the spoke is rotated, the spoke will be tightened or loosened as its threaded end is drawn into the threaded cavity 26 or withdrawn therefrom. However, in conventional practice it is difficult to retain the pin 24 and in some instances, a wrench must be used on the outside of the pin or in some instances, a screwdriver or other tool is used in cooperation with a slot formed in the flange 25 for holding the pin. In order to gain access for such purposes, the false rim 20 includes a plurality of apertures 30 whereby tools or the users fingers may be projected therethrough and placed in contact with an associated pin. Preferably, the apertures 30 are located between the adjacent ones of the pins so that one opening may be employed for access to at least two of the pins. Therefore, the apertures 30 need not be placed at every location between pins but at every other location. Also, when it is not desired to adjust or replace the pins, closure means are provided for closing the apertures such as is represented by snap caps 31. The snap cap includes a pair of spring biased members 32 normally biased so as to force against the edge marginal regions of the apertures so that the cap is held in place. However, it is to be understood that the bias of the spring members may be readily overcome so that the cap will yield to pressure for removable when it is desired to gain access to an adjacent pin.

Figure 3:
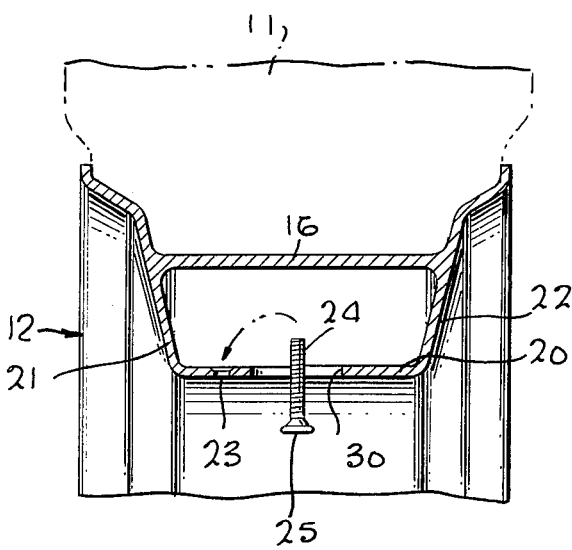
FIG. 3 is a transverse cross sectional view similar to the view of FIG. 2 showing a typical situation where access is needed for installing a spoke anchoring pin.

As shown more clearly in FIG. 3, the cap 31 has been removed and pin 24 may be inserted through aperture 30 and then placed into hole 23 where it may now be joined with a threaded end of a spoke. A bridge portion which is that portion of the second rim 20 separates the access hole 30 from the spoke anchor hole 23.

Therefore, it can be seen that the novel spoked wheel rim of the present invention provides a ready means for gaining access to spoke tension and anchoring pins without removing the tire or deflating the tire or tube. In order to change a pin or adjust the tension on the spoke, the user need only remove cap 31 from an opening or aperture 30 by overcoming the bias of the spring elements 32. Next, the user may place his finger through the opening and contact the flange 25 and by using his other hand, he may push the pin 24 up through the hole 23 for removable purposes. For tensioning purposes, the user may merely press his finger against the flange 25 while the pin is rotated for tensioning the spoke. To replace the pin 24, the pin is inserted through the access opening or aperture and then inserted through the hole 23 so that it is in position for use. If desired, access 30 may be placed between every pair or set of adjacent pins or, as noted previously, the access opening 30 may be placed between every other pair of pins.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A spoked wheel rim for mounting a plurality of spoke anchoring pins comprising the combination of:
   a circular main rim having a pair of outwardly projecting circular flanges adapted to sealingly engage with the beads of a tubeless pneumatic tire;
   a circular second rim arranged in fixed spaced apart relationship to said main rim so as to be coaxial therewith;
   a plurality of holes provided in said second rim for receiving and mounting one of said spoke anchoring pins therein;
   each of said plurality of holes having a diameter sufficient to receive the shank of one of said spoke anchoring pins;
   an access aperture provided in said second rim between adjacent pairs of said anchoring pins whereby access is gained to the radially outer end of a pair of said spoke anchoring pins via a single one of said access apertures; and
   said access aperture having a diameter substantially greater than said diameter of each of said holes so as to accept passage therethrough of the spoke anchoring pin;
   closure means removably covering each of said access apertures when not in use;
   said circular second rim has a center plane and said access apertures lie on said center plane in fixed spaced apart relationships; and wherein
   said plurality of holes are disposed on opposite sides of said center plane.

2. The invention as defined in claim 1 wherein said closure means includes a cap having resilient means for snap locking in cooperation with the edge marginal region of each of said access apertures.

3. The invention as defined in claim 2 wherein said second rim is rigidly connected to said main rim by a pair of sidewalls interconnecting the opposite edges of said rims.

4. The invention as defined in claim 3 wherein an annular passageway is defined between said rims and said sidewalls.

5. The invention as defined in claim 4 wherein said second rim is provided with access apertures at every anchoring pin.

6. The invention as defined in claim 5 wherein said spoked wheel rim is composed of metal so as to rigidize said rims.

7. The invention as defined in claim 1 wherein said second rim further includes a bridge portion integrally disposed between each of said holes and each of said access apertures so that said holes and said apertures are separated.

* * * * *